June 16, 1942.  R. O. HELGEBY  2,286,735
WARNING SIGNAL
Filed Sept. 9, 1940

Inventor
Ralph O. Helgeby
By Blackmor, Sencer & Flint
Attorneys

UNITED STATES PATENT OFFICE 2,286,735

WARNING SIGNAL

Ralph O. Helgeby, Flint, Mich., assignor to General Motors Corporation, Detroit, Mich., a corporation of Delaware Application September 9, 1940, Serial No. 355,938

2 Claims. (Cl. 200—56)

This invention relates to instruments such as speedometers and tachometers and has, for its object, the provision of a device associated therewith to give a warning signal—a sound or a light—when a predetermined reading is reached.

As a further object the invention includes the provision of an expedient to dampen vibrations or fluctuations of the movable indicating member when it approaches the position wherein it makes an electrical contact to close a circuit and give a signal.

Other objects and advantages will be understood as one reads the description which follows.

Figure 1:
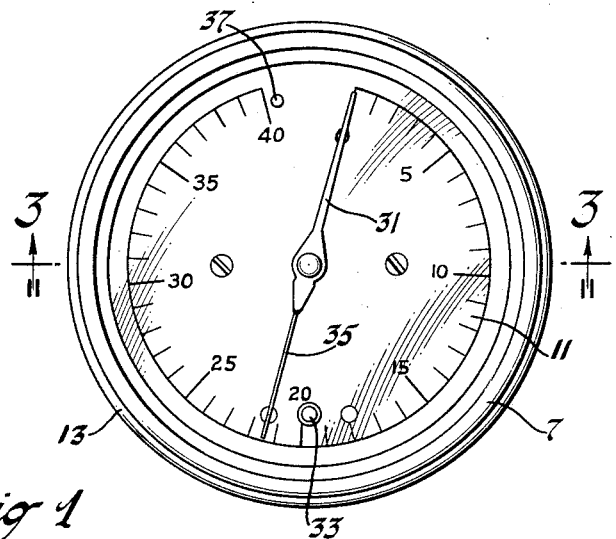
Figure 1 is a front elevation of a tachometer equipped with the invention.

Referring to the drawing, there is to be seen a casing marked 7. It is adapted to be secured by fastening means 9 to a suitable support. It is recommended that there be associated with the support some convenient form of rubber to prevent the transmission of vibrations. At the front of casing 7 is a cover glass 11 held in place by a conventional retaining ring 13. Within the casing is an instrument housing 15, the drawing being intended to represent an instrument serving to indicate speed of travel or revolutions per unit of time. There is a projecting boss 17 through which may pass the driving shaft, not shown. The casing is secured in metallic contact to the housing by fastening means 19. A dial 21 is secured with insulating pieces of rubber to the front of housing 15.

At 25 is shown a ground connection for the casing and housing. It will be observed that the opening at 27 in the dial for the passage of the spindle 29 of instrument pointer 31 is of such size as to prevent contact between the spindle and dial. At a selected point on the dial there is secured thereto to project therefrom a metallic pin 33, the pin being in the path of movement of the pointer. The pointer is somewhat flexible and when it contacts with the pin 33 it bends its resiliency serving to hold it firmly against the pin. The pointer has an extending tail piece 35 in the form of a light spring. The tail piece is adapted to engage a stop 37 positioned to contact the tail piece as the pointer approaches the pin. The resiliency of the tail piece, after it contacts the stop, serves to dampen any fluctuations or vibrations in the pointer. The contact with the stop does not stop the rotation of the pointer. It merely dampens its vibrations and make and break movements do not take place between the pointer and pin.

Figure 2:
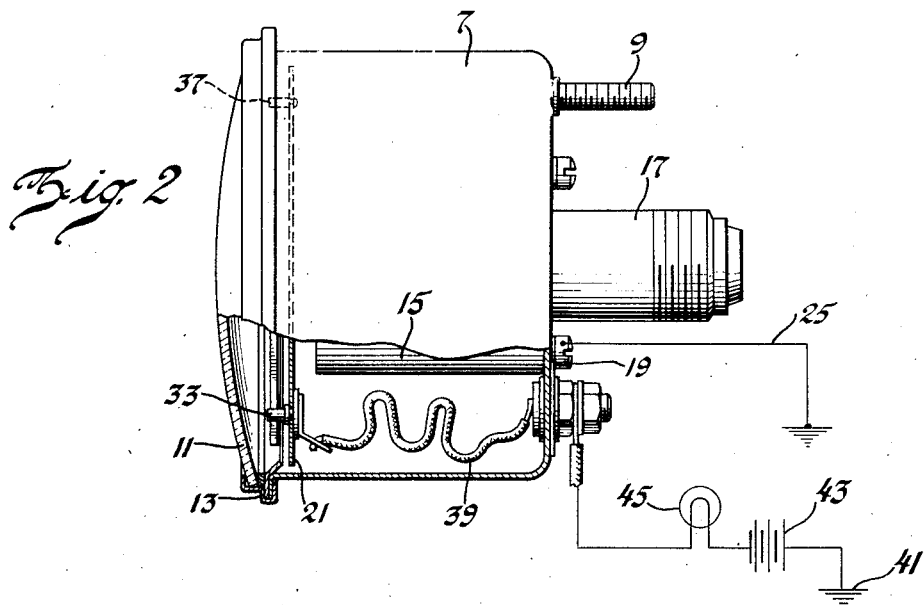
Figure 2 is a side elevation partly broken away and in section.
Figure 3:
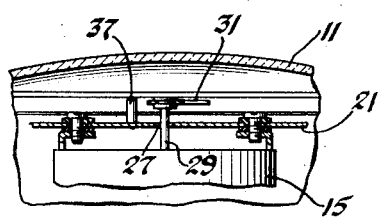
Figure 3 is a view in section as shown by line 3—3 on Figure 1.

As shown by Figure 2, a wire 39 is connected at one end to pin 33. Its other end, suitably insulated from the casing, is connected to the ground 41 by a wire. As shown there is a battery 43 as a source of electrical energy and a signal device 45 in the circuit. It will be understood that the drawing is diagrammatic and that the battery may be located in any convenient place. It may be the car battery. The signal device may be one to produce a sound or one to be illuminated. It, too, may be located as desired. In one installation under consideration it is proposed to locate the instrument adjacent the engine and the signal device on the panel where it may be seen or heard by the operator.

In operation the pointer rotates over the dial. Just before it reaches the pin the tail piece engages the stop. The resilient energy so created does not stop the pointer but dampens any vibratory movement it may have. The pointer itself, when it reaches the pin, also yields under the influence of its resiliency and the signal is not subject to make and break interruptions as might otherwise occur.

I claim:

1. An indicating instrument having a movable pointer, a pivot for said pointer between its first and second ends, a pin in the path of movement of the first end, contact between said first end and pin being adapted to close an electric circuit including a signal, the second end of said pointer being resilient and a stop positioned to engage said second end.

2. The invention defined by claim 1, the position of the stop being such that the second end of the pointer engages the stop before the first end engages the pin.

RALPH O. HELGEBY.